United States Patent [19]

Salsman

[11] Patent Number: 5,726,277

[45] Date of Patent: Mar. 10, 1998

[54] ADHESIVE COMPOSITIONS FROM PHTHALATE POLYMERS AND THE PREPARATION THEREOF

[75] Inventor: Robert Keith Salsman, Hoschton, Ga.

[73] Assignee: Seydel Companies, Inc., Georgia, S.C.

[21] Appl. No.: 191,319

[22] Filed: Feb. 2, 1994

[51] Int. Cl.$^6$ ............................................. C08G 63/02
[52] U.S. Cl. .................... 528/272; 428/480; 521/48.5; 524/600; 524/601; 524/604; 524/605; 525/43; 525/437; 528/274; 528/302; 528/308; 528/483
[58] Field of Search ........................ 528/272, 274, 528/302, 308, 483; 525/43, 437; 524/600, 601, 604, 605; 428/480; 521/48.5

[56] References Cited

U.S. PATENT DOCUMENTS

| | | | |
|---|---|---|---|
| 3,951,886 | 4/1976 | Miyake et al. | 521/48.5 |
| 4,048,104 | 9/1977 | Svoboda et al. | 521/159 |
| 4,485,196 | 11/1984 | Speranza et al. | 521/172 |
| 4,539,341 | 9/1985 | Hallmark et al. | 521/172 |
| 4,604,410 | 8/1986 | Altenberg | 521/172 |
| 4,701,477 | 10/1987 | Altenberg et al. | 521/167 |
| 4,758,607 | 7/1988 | Hallmark et al. | 521/172 |
| 4,977,191 | 12/1990 | Salsman | 521/48 |
| 5,252,615 | 10/1993 | Rao et al. | 521/48.5 |
| 5,281,630 | 1/1994 | Salsman | 521/48.5 |

*Primary Examiner*—Terressa Mosley
*Attorney, Agent, or Firm*—Cort Flint

[57] ABSTRACT

An adhesive or coating composition comprises a reaction product of terephthalate polymer and mixture of glycols in the presence of a glycolysis catalyst. The reaction product is further reacted with a difunctional organic acid. The recycled polymer which is formulated as adhesive or binder can be used in many fields.

6 Claims, No Drawings

ABSTRACT

ADHESIVE COMPOSITIONS FROM PHTHALATE POLYMERS AND THE PREPARATION THEREOF

BACKGROUND OF THE INVENTION

This invention relates to an adhesive composition obtained by glycolysing phthalate polymers, especially recycled terephthalate polymers, and the preparation thereof.

TECHNICAL BACKGROUND

Polyesters, especially polyethylene terephthalate (PET), are widely used for the manufacture of various commercial products, such as packaging film and containers. The manufacturing processes and spent consumer goods have created a huge amount of waste polyesters. Therefore, the utilization of those waste materials has become more and more important in view of economics and environmental protection. Many methods have been proposed for this purpose.

U.S. Pat. No. 4,758,607 discloses a polyester polyol mixture prepared by digesting recycled PET with glycols, and the mixture is useful in the preparation of cellulose foam materials.

U.S. Pat. No. 4,977,191 discloses a water-dispersible polyester sizing composition comprising a reaction product of waste PET glycols and oxyalkylated polyol.

U.S. Pat. Nos. 4,485,196; 4,048,104; 4,701,477 and 4,604,410 all propose reacting recycled PET scrap with alkylene glycols or polyols.

The present invention aims at producing an adhesive coating, or binder composition in various ready-to-use forms from waste polyesters and a glycol mixture.

SUMMARY OF THE INVENTION

It is an object of the present invention to provide an adhesive coating, or binder composition comprising a reaction product of terephthalate polymer and mixture of glycols in the presence of a glycolysis catalyst wherein the reaction product is further reacted with a difunctional organic acid.

It is another object of the present invention to provide a method of preparing the adhesive composition in ready-to-use forms.

DETAILED DESCRIPTION OF THE INVENTION

According to the present invention, the terephthalate polymers include polyalkylene terephthalates and poly(cycloalkylene) terephthalate. Although it is not intended to make any limitation, the waste polymer is especially polyethylene terephthalate, which is particularly useful in this invention. The waste polymer may come from many sources, such as sheets, container, textile waste and manufacturing waste, etc.

The alcohol used in the glycolysis of the waste polymer can be aliphatic, cycloaliphatic, aromatic and/or heterocyclic polyols, and are preferable selected from diols. More preferably are low molecular weight diols, such as diols having 2 to 20 carbon atoms. Examples of suitable diols are ethylene glycol, 1,5-pentanediol, 1,6-hexanediol, or mixture thereof. The polyols may be used as a mixture of two or more polyols. The preferred mixture contains diethylene glycol and neopentyl glycol.

During the glycolysis process, oxyalkylated polyols and other aliphatic polyols can also be added. Examples of these polyols include glycerol, trimethylol propane, trimethylolethane, pentaerythritol, erythritol, sorbitol, mannitol, other sugar or monosaccharides as well as polyoxyalkylene alcohols, such as polyoxyethylene glycol, polyoxypropylene glycol and polyoxyethylated glycerine.

The glycolysis of the waste polyesters can be carried out by heating the waste material, glycols, and optionally other polyols in the presence of a glycolysis catalyst until the waste polymers are broken down. It is very important that the waste polymers are broken down properly. This process normally requires a temperature of above 200° C. where the polymer reaches its decomposition point. In case of treating PET, the glycolysis temperature preferably ranges between 2400° C. and 250° C. In a preferred embodiment of the invention, the glycols used in the glycolysis are pretreated by heating in order to drive off any moisture contained, if any, in them. Although this pretreatment is not necessary, it is of benefit since glycols usually absorb moisture and moisture could poison the catalyst used in the glycolysis.

The catalysts used in the glycolysis can be selected from those known organometallic compounds, particularly compounds of tin or titanium. Preferred catalysts include tetraalkyl titanates with the alkyl up to 8 carbon atoms such as tetrapropyl titanate. The quantity of catalyst is usually 0.5% to 2% by weight, and goes down to less than 0.1% by weight, preferably about 0.05% by weight, when more than 50% by weight, based on the total reaction mixture, of waste material is present.

In a preferred embodiment of the present invention, the reaction mixture contains more than 50% by weight, based on the total reaction mixture of waste polymer. When charging large amounts of waste polymers, it is better to do it in stages in order to stir uniformly, especially in a large turbine agitator system, since the mass could lock up the agitator motor and cause severe problems. A three-or-more step charge can be used. The former charge should be liquified in the glycols before the next charge is made. Generally speaking, glycols, catalyst, waste polymer and other polyols can be charged in any order. Preferably the waste polymer is put into the mixture of glycols and catalyst.

During the glycolysis process, it is sometimes necessary to distill off a portion of the glycol decomposed from the waste polymer, such as ethylene glycol from PET, especially when a glycol used as starting material is similar to the one decomposed from the waste polymer. For this purpose, the equipment set up for the glycolysis usually has an overhead condenser and receiver. When glycols are different, such as neopentyl glycol and others used in glycolysis, it is advantageous to set the equipment up for reflux in order to minimize losses and increase yields.

The glycolysis reaction usually continues for at least one hour at about 240° C. or higher. As a further measure, a clear drop is taken. In this test, a drop of the molten glycolysis product is placed on a clear glass or plastic surface and observed for clarity. If the drop remains clear for 30 minutes, the molecular weight distribution of the glycolysis product is considered fairly uniform. The ratio of waste polymer to glycols at this stage runs from 7:1 to 1:3. Following the glycolysis step, it comes to the polymer build-up step, wherein a difunctional or multifunctional, organic acid needs to be added to the obtained reaction mixture for further reacting with oligomers produced from and terminated with hydroxyl groups. The organic acid can be aromatic or aliphatic, preferably aromatic. A suitable aromatic acid is isophthalic acid. It is very important to add the organic acid after the completion of the glycolysis, especially when a high level of waste polymer with high molecular weight is used. Terephthalic acid is not suitable at this stage because of the tendency for all terephthalic acid polymers to crystallize or to exhibit "plating out" in solvents such as water. The amount of the organic acid depends on the glycols used in the glycolysis step. The weight ratio of the acid to the glycols usually is in the range of 6:1 to 1:2, preferably from 5:1 to 1:1.5. The water produced during this reaction is advantageously removed from the reaction system. The reaction can be monitored by checking both acid value and viscosity against known successful runs. The acid value indicates how far the reaction is to completion and the viscosity measures how much free glycol remains. It is sometimes advantageous to leave a certain amount of acid value or hydroxyl value to achieve other properties in the finished product.

The whole process may optionally continue into its third stage, wherein free hydroxyl or acid functional groups are capped off by polycarboxylic acids or anhydrides thereof, such as trimellitic anhydride and maleic anhydride.

According to the present invention, the reaction product obtained from the above steps is further formulated into its end-use forms. They include water dispersions, emulsions, colloid dispersions, and solutions. In the preparation of colloidal dispersion, the obtained reaction product is dropped into a heated, aqueous solution containing a neutralizing agent. The temperature here is critical and must not be too hot as unproper high temperature would cause hydrolysis of the obtained polymer.

In the preparation of other dispersions, the obtained reaction product or recycled polymer is cooled, ground to a certain particle size, and then suspended in an aqueous mix containing a dispersing agent and/or a wetting agent. Thereafter the suspension is run through a dispersion mill which will grind the polymer down to required particle sizes, ranging from several microns to sub-micron size. It is very important that the polymer is moisture-insensitive so that it is not affected by the aqueous phase. Of importance as well is that the polymer has a high melting point, usually in the range of from 20° to 200° C., so it will keep from fusing (melting together) once ground.

In preparation of emulsions, water can be added to the molten resin either at a low temperature or under pressure. The water is added with strong agitation until an inversion in the phases occurs. The resulting product can be cooled for high solids emulsions, or further diluted if high solids are not required. Emulsions of this type are considered high solids if they contain 40% or more by weight of solids. Using this method products ranging from 20% to 70% solids can be produced. Alternately the polymer can be dropped into an aqueous phase with or without partial neutralization. An emulsifier can be added in either procedure if required.

In the preparation of fusible powder, the recycled polymer is ground to a very fine particle size, and then mixed with other coating ingredients.

The recycled polymer formulation can be used as adhesive, coating or binder in many fields. For example, they can be used as clay or pigment binder for textiles, paper, tissue; as laminating adhesive; as chip board or plywood binder or adhesive; as hot melt adhesive; as paint binder; as powder coatings; as coil or metal coatings; as general purpose glue; as caulking compounds and as sealants. When used as carpet backing, the recycled polymer powder, emulsion, or dispersion as made above is mixed with a filler, such as sand or clay, wetting agents or other binders, and optionally a cross-linking agent, and then cured on carpet.

When it is used as a non-woven binder for textiles or paper, etc, fibers are usually chopped in short staple and mixed with the binder, or the polymer itself can be extended as a fiber and mixed with other fibers. The entire mat is then heated to fuse the structure.

EXAMPLE 1

Glycolysis of Waste PET

Following materials were used:

| Raw material | Percent by weight |
| --- | --- |
| Diethylene glycol | 28.09 |
| Neopentyl glycol | 7.45 |
| Pentaerythritol | 3.13 |
| Witconol 4073 (ethoxylated glycerine, having 17–19 moles of ethylene oxide, molecular weight 850) | 16.20 |
| Tetrapropyl titanate | 0.18 |
| PET Rock or scrap | 44.95 |
| Process time | 4–8 hrs. |

Into a reactor with a stir means, were charged diethylene glycol, neopentyl glycol, pentaerythritol and witconol 4073. Under agitation, nitrogen was passed at 60 SCFH. The reactor was heated to 190° C. while water was collected in a receiver. Thereafter, the tetrapropyl titanate catalyst was added. The reactor is heated up to 240° to 245° C. with continuing agitation and nitrogen. While maintaining the temperature at 240°–245° C., PET Rock was charged into the reactor. The distillate was collected in a decanter, and the amount of collected distillate was monitored. When the collected distillate equalled to approximately 4% by weight of the charge, the reactor was cooled and a clear drop was taken for check for at least 30 minutes.

EXAMPLE 2

Preparation of Adhesive Composition

Following materials were used:

| Raw material | Percent by weight |
| --- | --- |
| Diethylene gylcol | 5.24 |
| Neopentyl glycol | 1.39 |
| Pentaerythritol | 0.59 |
| Witoconol 4073 | 3.03 |
| Tetrapropyl titanate | 0.03 |
| PET Rock | 8.39 |
| Isophthalic Acid-99 | 7.14 |
| Trimellitic Anhydride | 1.71 |
| Ammonium Hydroxide | 0.96 |
| Water | 71.52 |
| Process time | 15–24 hrs. |

Into a reactor with a stir means, were charged diethylene glycol, neopentyl glycol, pentaerythritol and witconol 4073. Under agitation, nitrogen was passed at 60 SCFH. The reactor was heated to 190° C. while water was collected in a receiver. At the temperature of 190° C., the titanate catalyst was added through a liquid catalyst addition tank. The catalyst produced clouds of fumes on contact with glycol or water vapor. With agitation and nitrogen passing, the reactor was heated to 240°–245° C. when PET Rock was charged. While maintaining the temperature at 240°–245° C., the distillate was collected in decanter. After having collected approximately 4% of the charge as distillate, the reactor was cooled and a clear pill was taken for check for at least 30 minutes. When the reactor was cooled to 180° C., isophthalic acid was charged and distillion was started again. The reactor was heated to 220°–230° C., samples were taken every 30 minutes. When the acid value and viscosity met the requirements, the reactor was again cooled to 150°–160° C. where the nitrogen was stopped and trimellitic anhydride was added. Thereafter, ammonium hydroxide was added to a drop tank containing water at temperatures of 43° C. The solid resin in the reactor was transferred under pressure into the bottom of the drop tank with agitation. The pH value was maintained by adding ammonium hydroxide solution. The final pH value was 7.0–7.5. The batch was cooled to less than 30° C. The analysis results are given as follows:

| Property | Specifications | Test method |
| --- | --- | --- |
| Solids content (%) | 25% ± 1% | 1 gm in Al dish, 30 min in 155° C. oven |
| pH | 7.0–7.5 | pH meter |
| Appearance | Clear, light amber | visual |
| Viscosity | 5–25 cps | Brookfield 2/20 RVT @ 25° C. |
| Color | 5 maximum | Gardner-Holt |

EXAMPLE 3

Preparation of Adhesive or Coating Composition

Following materials were used:

| Raw material | Amount (g) | % |
| --- | --- | --- |
| Diethylene glycol | 28.20 | 7.05 |
| Neopentyl glycol | 45.08 | 11.27 |
| Isophthalic acid | 44.64 | 11.16 |
| PET | 281.84 | 70.46 |
| Tetrapropyl titanate | 0.24 | 0.06 |

With $N_2$ slowly passing, glycols were charged into a reactor at room temperature. When the temperature of the reactor reached 190° C., tetrapropyl titanate and 200 g of PET were added. Half an hour later, 81.84 g of the remaining PET was added at 210° C. Heating was continued until the temperature reached 245° C. After about 12 minutes at this temperature, isophthalic acid was added while cooling the reactor. Heating up again to 245° C., the reactor was then cooled when 11 ml of distillate was collected and the acid value was at 2.8. The adhesive or coating composition was obtained.

EXAMPLE 4

Preparation of Adhesive Composition

Following materials were used:

| Raw material | Amount (g) | % |
| --- | --- | --- |
| Diethylene glycol | 32.30 | 16.15 |
| 25-R-8 | 21.40 | 10.70 |
| PET | 126.26 | 63.13 |
| Tetrapropyl titanate | 0.10 | 0.05 |
| Isophthalic acid | 19.99 | 9.97 |

The preparation was carried out according to the similar procedure of Example 3.

EXAMPLE 5

Preparation of Adhesive Composition

Following materials were used:

| Raw material | Amount (g) | % |
| --- | --- | --- |
| Diethylene glycol | 32.30 | 16.15 |
| PEG-8000 | 21.40 | 10.70 |
| PET | 126.26 | 63.13 |
| Isophthalic acid | 19.94 | 9.97 |
| Tetrapropyl titanate | 0.10 | 0.05 |

The preparation was carried out according to the similar procedure of Example 3.

EXAMPLE 6

Recycled Polymer Emulsion

Following materials were used:

| Raw material | Amount (g) | % |
| --- | --- | --- |
| Neopentyl glycol | 62.8 | 15.7 |
| Diethylene glycol | 37.2 | 9.3 |
| PET | 129.6 | 32.4 |
| Isophthalic acid | 110.8 | 27.7 |
| Tetrapropyl titanate | 0.4 | 0.1 |
| Maleic acid | 25.2 | 6.3 |
| PEG 4000 (polyethylene glycol) | 34.0 | 8.5 |

The waste PET was broken down according to the similar procedure of the Example 1. Isophthalic acid was added thereafter. After having collected 25 ml distillate and with the acid value at 60, maleic acid was added at the temperature of 190° C. and then PEG 4000 added. The reaction mixture was held at 195° C.–120° C. for thirty minutes. With agitation water was the added slowly to form an emulsion.

EXAMPLE 7

Recycled Polymer Emulsion

Following materials were used:

| Raw material | Amount (g) | % |
| --- | --- | --- |
| Diethylene glycol | 66.94 | 33.49 |
| Tetrapropyl titanate | 0.4 | 0.1 |
| Isophthalic acid | 110.8 | 27.7 |
| PEG 4000 | 18.18 | 9.09 |
| PET | 62.04 | 31.02 |

Dipropylene glycol, PEG-4000 and tetrapropyl titanate were mixed together and heated to 200° C. Adding PET, the resulting mixture was heated to 240° C. After collecting 3 ml distillate and returning it back to the mixture, the reactor was cooled to 200° C. and isophthalic acid was added. Heating back to 240° C. again, 12.5 ml distillate was collected at 11. The mixture was cooled to 100° C. and 188 g of water was added to form an emulsion. There was a very clear inversion at 79° C. Whereas the present invention has been described in some details, it should be understood that the invention is not limited thereto. Many modifications may still be made within the spirit and scope of the invention. It is therefore, contemplated to cover all such modifications which fall within the scope of the appended claims.

We claim:

1. An adhesive or coating water dispersible composition comprising a reaction product of at least 50% by weight of a waste terephthalate polymer and a mixture of glycols including an oxyalkylated polyol in the presence of a glycolysis catalyst wherein the reaction product is further reacted with a difunctional, organic acid and wherein the weight ratio of acid to glycols is in the rarige of 6:1 to 1:2.

2. An adhesive or coating composition of claim 1, wherein the catalyst constitutes less than 0.1% by weight of the total reaction mixture.

3. An adhesive or coating composition of claim 1, wherein the waste terephthalate polymer is waste polyethylene terephthalate.

4. An adhesive or coating composition of claim 1, wherein the mixture of glycols contains diethylene glycol or neopentyl glycol.

5. An adhesive or coating composition of claim 1, wherein the organic acid is isophthalic acid.

6. The adhesive or coating composition of claim 1, wherein the weight ratio of acid to glycols is in the range of 5:1 to 1:1.5.

* * * * *